United States Patent [19]
Raber

[11] Patent Number: 4,865,636
[45] Date of Patent: Sep. 12, 1989

[54] INTERLOCKING WEDGE FOR PLEATED PAPER FILTER ELEMENT

[75] Inventor: Robert R. Raber, Los Alamitos, Calif.

[73] Assignee: Farr Company, El Segundo, Calif.

[21] Appl. No.: 145,874

[22] Filed: Jan. 20, 1988

[51] Int. Cl.$^4$ .............................................. B01D 46/02
[52] U.S. Cl. ...................................... 55/484; 55/497; 55/499; 55/516; 55/521
[58] Field of Search ................. 55/484, 485, 497, 499, 55/514, 516, 521

[56] References Cited

U.S. PATENT DOCUMENTS

| | | | |
|---|---|---|---|
| 3,138,443 | 6/1964 | Engle et al. | 55/521 X |
| 3,402,531 | 9/1968 | Farr | 55/484 X |
| 3,430,420 | 3/1969 | Gross | 55/521 X |

*Primary Examiner*—Charles Hart
*Attorney, Agent, or Firm*—Lyon & Lyon

[57] ABSTRACT

An interlocking wedge for pleated paper filter elements of the type having a plurality of pleated paper filter panels secured in a frame in a zig-zag configuration with plural apexes adjacent both the upstream and downstream ends of the frame forming plural wedge shaped air inlet and outlet spaces and a plurality of elongated V-shaped spacing wedges disposed in the downstream wedge shaped air outlet spaces adjacent the panels wherein the downstream end of each of the wedges extends transversely through one of the outlet openings in the downstream end of the frame and define recessed areas so as to provide an interference fit between said portions of the wedges in the downstream end of the frame to interlock the wedges with the frame and thereby prevent lateral separation of the wedges with respect to the frame upon the element being subject to uneven loading.

3 Claims, 2 Drawing Sheets

INTERLOCKING WEDGE FOR PLEATED PAPER FILTER ELEMENT

BACKGROUND OF THE INVENTION

This invention relates to an improvement in the construction of pleated paper filter assemblies of the type used to filter the air intake on diesel locomotives. More particularly, the present invention is related to an improvement of the filter assembly disclosed in U.S. Pat. No. 3,402,531 wherein the wedge supports disposed between adjacent filter panels arranged in a V-configuration are interlocked with the filter frame to prevent displacement of the media and supporting wedges and resulting media damage upon the filter assembly being subjected to non-uniform loading.

U.S. Pat. No. 3,402,531, the teachings of which are hereby incorporated by reference, discloses a compact filter assembly for providing a large filter area in a relatively small and inaccessible space which employs individual filter elements each including pleated paper filter panels mounted in a zig-zag configuration in a housing. A plurality of the elements may be mounted in a side by side relationship and stacked relationship to provide the assembly which is particularly useful for filtering the intake air of a diesel locomotive engine or the like. To provide support and prevent buckling of the panels as a result of air passing therethrough, V-shaped wedges are disposed between the adjacent pleated paper filter panels in the downstream wedge spaces defined by the "mouth ends" of the Vees. While such a configuration has provided an excellent and highly successful filter assembly, problems have arisen when the filter assembly is subjected to uneven loading which can result from excessive moisture on the media or localized build-up of foreign matter thereon.

As a result of such uneven loading, ruptures in the media have occurred adjacent the downstream end of the assembly. It has been discovered that the damage occurred as a result of the media and the adjacent supporting wedges being forced by the uneven loading laterally away from the rear pans of the filter assembly which extend about the downstream ends of the filter panels to secure the panels in place. During such an occurrence, the media acts like a membrane and is extruded under pressure through the lateral separation and ruptures. When the loading is relieved, the media and wedge supports return to their original positions adjacent the pans disguising the cause of the failure. The present invention prevents such occurrences without adversely affecting the performance of the filter assembly or the cost of its construction.

SUMMARY OF THE INVENTION

Briefly, the invention comprises the use of V-shaped wedges disposed between adjacent pleated paper filter panels and extending substantially the length thereof wherein the wedges define recessed areas adjacent the downstream ends thereof to accommodate an interlock with the filter frame to prevent lateral displacement of the wedges with respect to the frame upon the filter assembly being subjected to uneven loading without interfering with the positioning or insertion of the panels within the frame.

It is the principal object of the present invention to prevent damage to the filter media in a filter assembly employing pleated panels of paper filter media disposed in a zig-zag configuration upon the filter assembly being subject to uneven loading.

It is another object of the present invention to provide securement of the support wedges to the assembly frame in a filter assembly employing pleated panels of paper filter media disposed in a zig-zag configuration to avoid lateral displacement of the wedges and adjacent media with respect to the frame upon the filter assembly being subjected to uneven loading.

It is yet another object of the present invention to provide a securement of the support wedges in a filter assembly employing pleated panels of paper filter media disposed in a zig-zag configuration which is of economical construction and avoids interference with the mounting and proper securement of the pleated panels in the filter frame.

These and other objects and advantages of the present invention will become apparent from the following detailed description taken in conjunction with the accompanying drawings.

IN THE DRAWINGS

DESCRIPTION OF THE PREFERRED EMBODIMENT

Figure 1:
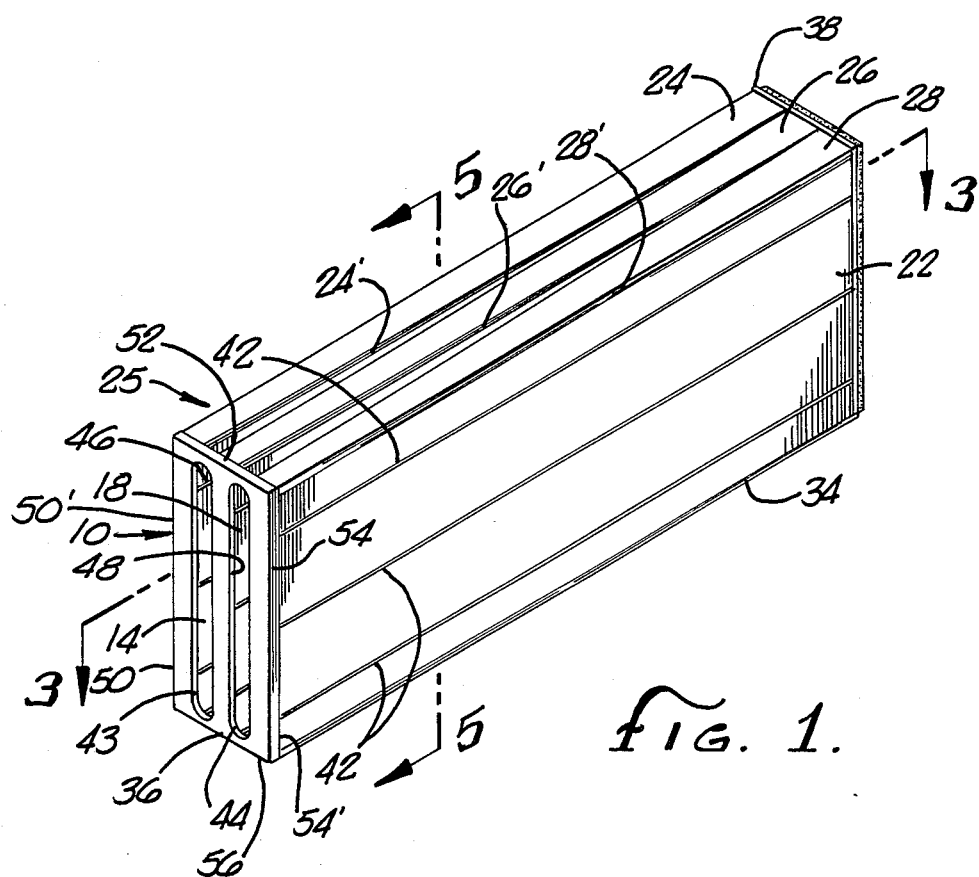
FIG. 1 is a perspective view of a filter assembly employing the interlocking wedge support of the present invention.
Figure 2:
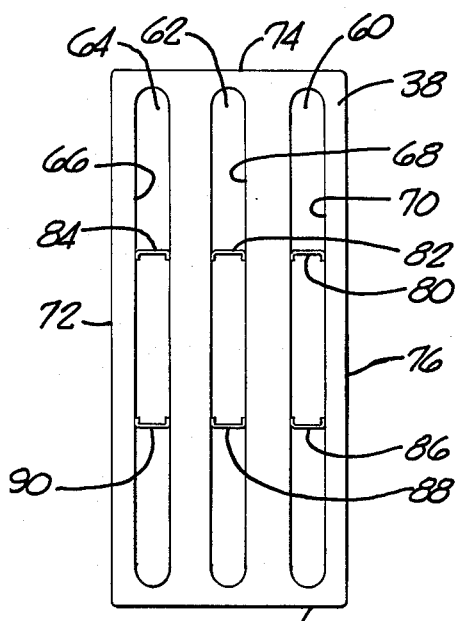
FIG. 2 is an end view of the filter assembly employing the present invention.
Figure 3:
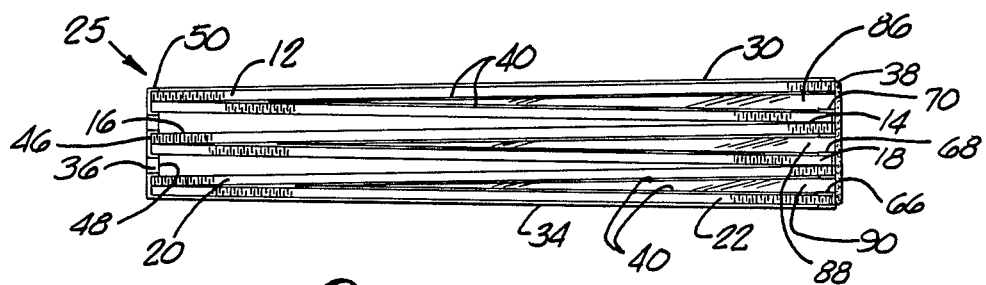
FIG. 3 is a sectional view taken along lines 3—3 in FIG. 1.

Referring now in detail to the drawings, FIG. 1 illustrates a filter element 10 of the type used to filter the air intake on a diesel locomotive and which is the subject of U.S. Pat. No. 3,402,531. At best seen in FIG. 3, the filter element 10 is comprised of a plurality of adjacent pleated paper filter panels 12-22 arranged in a V-configuration and extending from the front to the rear of the element 10 thereby forming a zig-zag configuration of filter panels. The spaced ends of the Vees opposite the apexes thereof at the upstream end of the filter element define the inlet ends and each provides a wedge-shaped space or converging passageway for air to enter. The spaced ends of the Vees at the downstream end define the outlet ends and each provides a wedge-shaped space or diverging passageway for clean air. The filter panels are secured in place in a frame 25 comprised of tapered elongated top pans 24, 26 and 28 and correspondingly tapered elongated bottom pans 30, 32 and 34, which are secured together by front pan 36 and rear pan 38.

Figure 5:
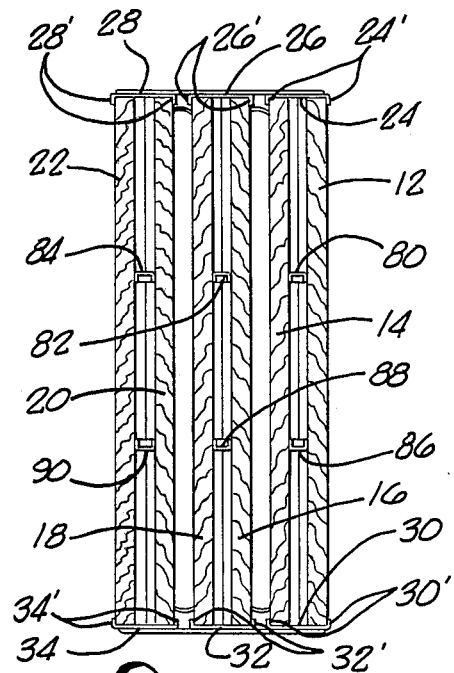
FIG. 5 is a sectional view taken along lines 5—5 in FIG. 1.

To secure the related panels 12-22 within the frame 25, the top and bottom pans of frame 25 define lateral panel retaining flanges 24', 26', 28', 30', 32' and 34', as seen in FIG. 5. Panels 12 and 14 are disposed between top pan 24 and bottom pan 30 adjacent flanges 24' and 30'. Beads 42 of a plastisol adhesive are disposed along the exterior sides of the filter panels 12-22 transverse to the pleats therein to retain the pleated configuration of the panels. Pleated paper panels 16 and 18 are similarly secured between pans 26 and 32 adjacent flanges 26' and 30' and panels 20 and 22 are secured between pans 28 and 34 adjacent lateral flanges 28' and 34' thereby defining a zig-zag configuration of pleated paper panels. An adhesive 40 such as self adhering brown vinyl adhesive is disposed between the lateral ends of the pleated paper panels and the respective top and bottom pans to secure the panels in the deep V-configuration defined by the pans and their lateral flanges.

The front pan 36 which forms the air inlet end of the filter element 10 defines a pair of air inlet slots 43 and 44 therein adjacent and between the spaced inlet ends of filter panels 14 and 16 and the spaced upstream ends of panels 18 and 20, respectively. Interior flanges 46 and 48 are formed in the pan 36 about the perimeter of slots 43 and 44 and rearwardly extending exterior flanges 50-56 are formed about the perimeter of the pan 36. Flanges 46 and 48 cooperate with flanges 50 and 54 to retain the inlet ends of the filter panels in place, while the extended ends 50' and 54' of flanges 50 and 54 and flanges 52 and 56 extend over the inlet ends of the top and bottom pans to secure the front pan 36 to the top and bottom pans 24-34. A suitable adhesive such as self adhering brown vinyl adhesive is disposed between the inlet ends of the filter panels and the front pan and between the juncture of the top and bottom pans and the front pan to secure the upstream or inlet end of the filter element 10.

The rear pan 38 which forms the outlet end of the filter element 10 defines air outlet slots 60-64 therein adjacent and between the outlet ends of filter panels 12 and 14, 16 and 18, and 20 and 22, respectively. Interior flanges 66-70 are formed in the pan 38 about the perimeter of outlet slots 60-64 and rearwardly extending exterior flanges 72-78 are formed about the outer perimeter of the rear pan 38. Flanges 66-70 cooperate with flanges 72 and 76 to retain the outlet ends of the filter panels in place. The extended ends of flanges 72-78 which extend about the perimeter of rear pan 38 extend over the outlet ends of the top and bottom pans 24-34 to secure the rear pan 38 to the top and bottom pans. A suitable adhesive is again employed as discussed above to obtain the securement of the downstream or outlet end of the filter element 10.

Figure 4:
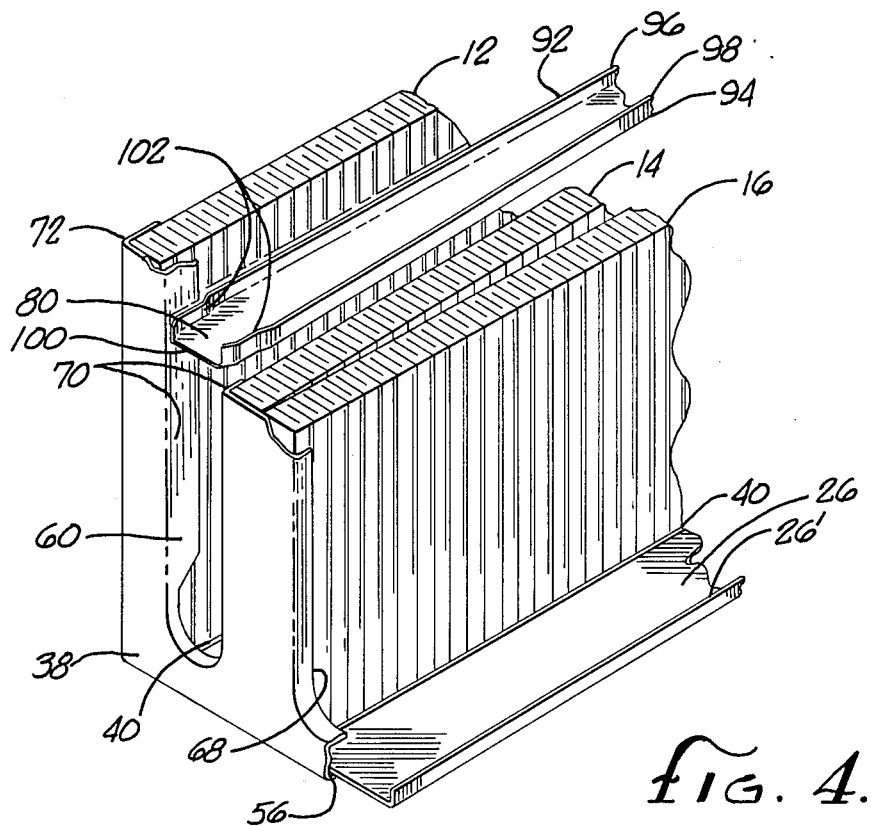
FIG. 4 is an enlarged perspective view showing the interlocking attachment of the supporting wedges to the frame pan.

Metal V-shaped wedges 80-90 are provided between adjacent filter panels in the downstream wedge spaces defined by the "mouth ends" of the Vees to support and prevent bucking of the panels as a result of air flow therethrough. Preferably, two wedges are so disposed in parallel spaced relationship between panels 12 and 14, between panels 16 and 18 and between panels 20 and 22. As the configuration of each of the wedges and its securement is identical, only wedge 80 will be discussed herein in detail. As seen in FIG. 4, to provide a support surface for the filter panels, the edged portions 92 and 94 of wedge 80 are bent laterally to define tapered support flanges 96 and 98 which abut and extend parallel to the converging filter panels 12 and 14. For illustration purposes panel 14 is shown cut away below wedge 80 in FIG. 4. An adhesive such as polyvinyl acetate is disposed between the support flanges and the paper media to secure the media to the wedges. The downstream end 100 of wedge 80 defines a pair of oppositely disposed recesses 102 therein adapted to receive oppositely disposed portions of flange 70 disposed about the perimeter of air outlet slot 60. Recesses 102 are sized such that the elliptical flange 70 extends into recesses 102 in an interference fit thereby interlocking wedge 80 to the rear pan 38 of the filter element frame 25. Wedges 82 through 90 are of the same configuration and are similarly secured to the rear pan 38. By means of this interlock, the wedges are prevented from moving laterally relative to the frame upon the filter element 10 being subjected to uneven loading and the damage to the paper media heretofore experienced in such situations is prevented.

Various changes and modifications may be made in carrying out the present invention without departing from the spirit and scope thereof. Insofar as these changes and modifications are within the purview of the appended claims, they are to be considered as part of the present invention.

I claim:

1. In a filter element of the type having a plurality of pleated paper filter panels secured in a frame in a zig-zag configuration with plural apexes adjacent both the upstream and downstream ends of the frame, forming plural wedge-shaped air inlet and outlet spaces and a plurality of elongated V-shaped spacing wedges disposed in the downstream wedge-shaped air outlet spaces adjacent said panels, the improvement comprising portions of said wedges extending transversely through one of said outlets in the downstream end of said frame, said portions being of a reduced transverse dimension so as to define a pair of oppositely disposed recessed areas in each of said wedges adjacent the downstream end of said frame, said recessed areas receiving portions of said downstream end of said frame and defining interference fits therebetween adjacent said air outlets thereby interlocking said wedges with said frame to prevent lateral separation of said wedges with respect to said frame upon said element being subjected to uneven loading.

2. The improvement of claim 1 wherein said frame defines a plurality of inwardly directed annular flanges disposed about the perimeter of each of said air outlets for retaining the downstream apexes of said panels in place and the reduced transverse dimension of each of said wedges being substantially equal to the thickness of one of said arcuate flanges whereby said interference fit is obtained without reducing the transverse dimension between adjacent annular flanges.

3. In a filter element of the type having a plurality of pleated paper filter panels secured in a frame in a zig-zag configuration with plural apexes adjacent both the upstream and downstream ends of the frame, forming plural wedge-shaped air inlet and air outlet spaces, the frame including a plurality of inwardly directed annular flanges disposed about the perimeter of each of said air outlets for retaining the downstream apexes of said panels in place, and a plurality of elongated V-shaped spacing wedges disposed in the downstream wedge-shaped air outlet spaces, said wedges defining integrally formed lateral flanges extending the length thereof and disposed adjacent said panels to provide a contact support surface for said panels, the improvement comprising: portions of each of said wedges extending through one of said air outlets in the downstream end of said frame, said portions being of a reduced transverse dimension so as to define a pair of oppositely disposed recessed areas in each of said wedges adjacent the downstream end of said frame, said recessed areas receiving portions of said downstream end of said frame and defining interference fits therebetween adjacent said air outlets thereby interlocking said wedges with said frame to prevent lateral separation of said wedges with respect to said frame upon said element being subject to uneven loading, said recessed areas being defined by an inward displacement of the lateral flanges on said wedges in said portion, and said displacement being substantially equal to the thickness of one of said annular flanges in said frame.

* * * * *